Oct. 23, 1962    H. W. FULLER ET AL    3,060,431

MAGNETIC DATA STORAGE TECHNIQUES

Filed Feb. 8, 1956    2 Sheets-Sheet 1

INVENTORS
HARRISON W. FULLER
CARL W. LEDIN

BY Joseph Weingarten
ATTORNEY

MAGNETIC DATA STORAGE TECHNIQUES

Filed Feb. 8, 1956 2 Sheets-Sheet 2

INVENTORS
HARRISON W. FULLER
CARL W. LEDIN

BY Joseph Weingarten
ATTORNEY 3,060,431

MAGNETIC DATA STORAGE TECHNIQUES

Harrison W. Fuller, Boston, and Carl W. Ledin, Islington, Mass., assignors to Laboratory for Electronics, Inc., Boston, Mass., a corporation of Delaware Filed Feb. 8, 1956, Ser. No. 564,229
1 Claim. (Cl. 346—74)

The present invention relates in general to new and improved methods for processing information in magnetic data storage systems and means for implementing these methods.

The term "processing" information is taken as descriptive of the process of recording of data, i.e., the transfer of information into the storage system, as well as the reading of data out of the system. In the following discussion, for the sake of clarity, reference will be had to the recording of data, it being understood that the improvements discussed herein are equally applicable when data is read out.

In general, the term "magnetic recording" relates to a process whereby data is stored in a magnetic medium, the data to be stored being transferred to the recording surface of the magnetic medium by means of a magnetic head. The data signals may be in analog or digital form having spectral components at audio frequencies or higher. Magnetic storage systems are peculiarly adapted to the processing of data reduced to binary code notation. In such notation the data is reduced to binary digits or bits, one bit of data being represented by either a Zero or a One pulse.

The number of bits of data which may be stored per linear inch of recording surface is limited, among other factors, by the spacing of the pole pieces of the magnetic head from the recording surface of the magnetic medium. The pole pieces are separated from each other by a short gap and terminate in a common pole face surface having the gap traverse its width. Magnetic flux lines are set up between the pole pieces across the gap, the fringing flux lines encountering the recording surface and magnetizing a predetermined portion thereof. A short gap is necessary to yield high resolution when recording as well as when reading data out of the system. The ratio between gap length and the wavelength of stored data along the recording medium should not exceed 1:4. For example, in high density recording of the order of 1000 bits per inch, the gap length should not exceed ¼ mil. The spacing of the pole face surface from the recording surface, as measured at the gap, is in large part responsible for the spreading of magnetic flux between these surfaces. When flux spreading occurs, the lines of flux which fringe between the two pole pieces, magnetize a greater than desired portion of the recording surface. In magnetic data storage systems where the wavelength of the recorded information measured along the recording medium is relatively short, for example, high-density digital storage systems where the number of bits to be stored per linear inch may exceed one thousand, minimum flux spreading is required to concentrate the magnetic field and bring about high resolution of data. Accordingly, minimum spacing between the surfaces, as measured at the gap, is necessary.

In the past, different solutions to this problem have been attempted with varying degrees of success. In-contact recording, where the spacing between the surfaces is zero and the pole pieces ride in contact with the recording surface, while eliminating flux spreading due to the separation of the surfaces, entails the problem of wear due to abrasion, chipping and scoring of the pole face surface and of the medium recording surface. Chipping of the pole face surfaces in the vicinity of the gap between the pole pieces is particularly pronounced when ferrite heads are used. To a certain extent abrasive wear may be alleviated in in-contact recording apparatus by means of boundary (thin film) lubrication. However, in long term usage the loss of pole piece material due to abrasion and, more significantly in the case of ferrite, due to chipping, still presents an important problem. It must be kept in mind that the loss of a 10 mil chip in the vicinity of the gap may represent the loss of one third of the width of a 30 mil wide pole face surface and hence, may result in the loss of data. Of even greater importance is the fact that chipping in the vicinity of the gap may increase the effective gap length thereby reducing resolution in reading out data, as well as reducing the practical linear bit density which may be recorded.

The physical separation between the pole face surface and the recording surface which will maintain tolerable flux spreading in high-density magnetic recording of the order of 1000 bits per inch, is approximately 0.2 mil as measured at the gap of the pole face surface. The mechanical problem of fixedly mounting a multitude of magnetic heads to have their pole face surfaces at a distance of 0.2 mil from a moving multi-track recording surface is staggering and the cost is prohibitive, where ambient temperature changes alone may account for a variation in the separation spacing of more than 0.2 mil. In another solution to this problem, air is blown against the recording surface through a nozzle attached to each individual head or head mount. The Venturi forces brought about by the escape of air from the space between the recording surface and the pole face surface of the head, float the latter out of contact with the recording surface at a distance dependent partially upon the air pressure which is maintained. This arrangement is extremely complex when it is considered that the individual head mounts must be moveably arranged to vary the spacing between the surfaces in response to small air pressure changes, while at the same time carrying the air nozzles and a portion of the air supply means. Additionally, constant separation of the surfaces is critically dependent upon constant air pressure.

It will be appreciated that a need exists for improved methods of out-of-contact processing of information in short wave length magnetic data storage systems and simple means for carrying out the same.

Accordingly, it is an object of this invention to provide new and improved methods of processing information in short wave-length magnetic data storage systems which are not subject to the foregoing disadvantages.

It is a further object of this invention to provide simple and economical methods of out-of-contact magnetic data processing.

It is another object of this invention to provide methods of out-of-contact magnetic data processing wherein a hydrodynamic effect of an applied fluid is used to maintain constant separation between the pole face surface of the magnetic head and the recording surface of the magnetic medium.

It is still another object of this invention to provide methods of out-of-contact magnetic data processing wherein constant separation between the surfaces is not critically dependent upon the pressure of the fluid supply.

It is an additional object of this invention to provide means for carrying out the foregoing methods.

Briefly stated, the methods and means which form the subject matter of this invention contemplate the application of force to bias the pole face surface of a magnetic head and the recording surface of a magnetic medium into proximate mutually confronting relationship, the initiation of relative lateral motion between said surfaces, the creation of fluid flow relative to one of said surfaces and substantially between both of them to develop a hydrodynamic effect having a component of force which balances the biasing force at a predetermined constant spacing of the surfaces from each other, and the exchange of data between the pole pieces and the recording surface across said spacing.

These and other novel features of my invention together with further objects and advantages thereof will become more apparent from the following detailed specification with reference to the accompanying drawings, in which.

Figure 1:
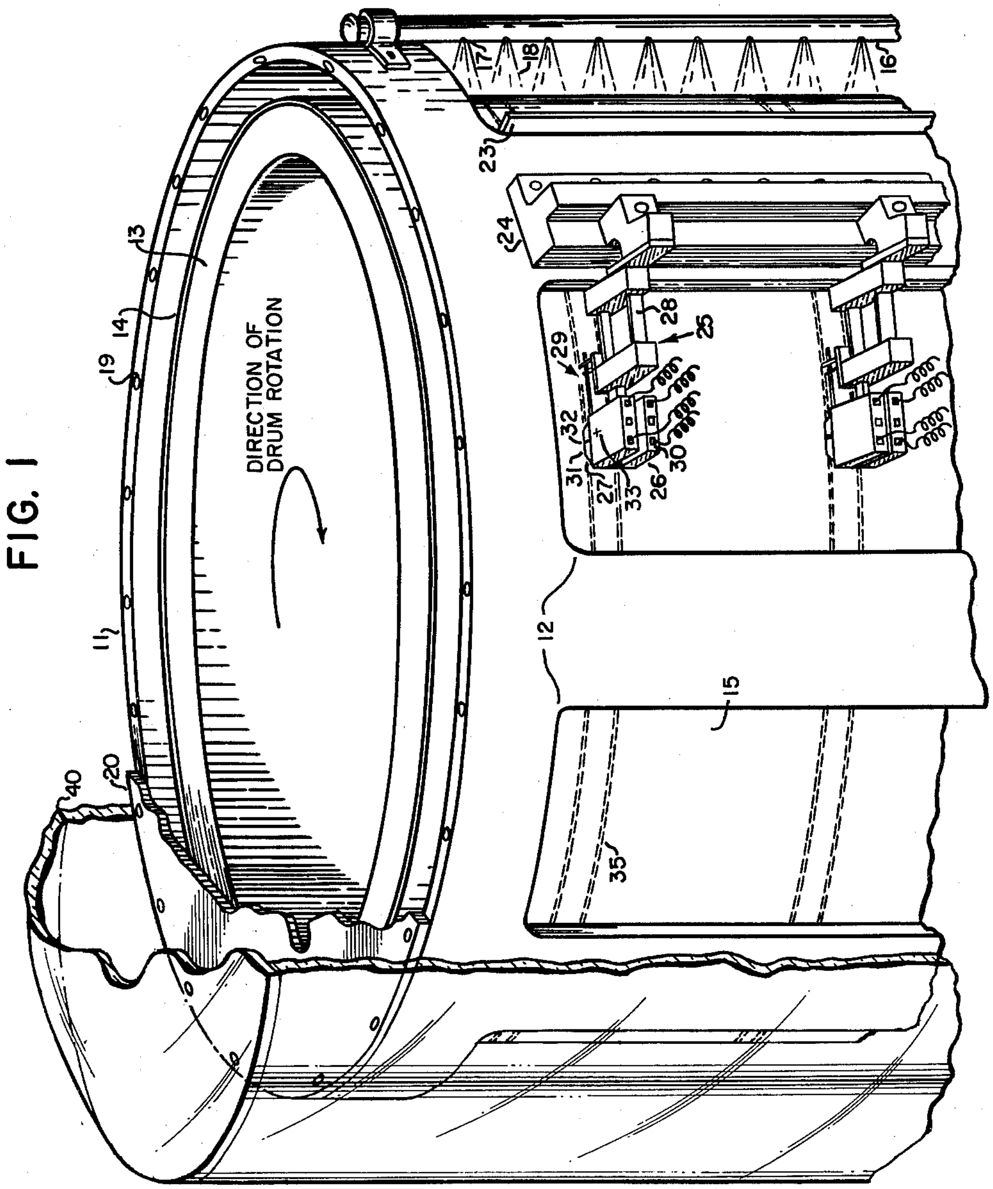
FIG. 1 illustrates one embodiment of the invention wherein a high-density data storage system is shown which utilizes a principle of fluid dynamics to maintain constant separation between the magnetic surfaces.

In practicing the invention to obtain the above objects, the principle of fluid dynamics utilized herein is referred to as hydrodynamic or thick-film lubrication. In hydrodynamic lubrication, contact between the two surfaces being lubricated is completely avoided. In contradistinction thereto, in the more familiar thin-film lubrication at least partial contact of the surfaces may be expected. A plane slider bearing is an example of a configuration which utilizes hydrodynamic lubrication. Here, a load is supported by a rectangular pad, the surface of which presses upon a bearing surface. Relative lateral motion between the two surfaces is initiated and a lubricating fluid is maintained in the space between them. Hydrodynamic lubrication will take place if the surfaces are maintained at a tilt angle with respect to each other. This angle is dependent upon the pad geometry, the position of the point of load application to the pad, the magnitude of the load, the relative velocity of the surfaces, the viscosity of the fluid and, in the case of a pivotally mounted surface, on the position of the pivot axis. In one form of the plane slider bearing, the pad is pivoted about a line axis which is positioned off the center of the pad away from the leading edge of the pad surface. The leading edge of the pad surface is defined as the edge which first encounters the bearing surface due to the relative lateral motion of the two surfaces. The load is applied to the pad at the pivot axis. The motion of the lubricant between the two surfaces is such as to produce a positive (supporting) pressure distribution along the length of the pad. This pressure distribution results in a movement about the pivot axis, tending to rotate the leading edge of the pad surface away from the bearing surface until an equilibrium position is reached at the tilt angle position. The total supporting force on the pad resulting from the integration over the pad surface of the positive pressure distribution exactly equals the load applied to the pad in the equilibrium condition. Thus, in equilibrium a minimum, non-zero separation occurs at the trailing edge of the pad, which is dependent on the above-recited parameters. Additionally, a frictional force acts in a direction opposite to the direction of relative lateral motion, but is small enough to be without appreciable effect on the equilibrium geometry.

In another form of the plane slider bearing, the pad is not pivoted and the tilt angle of the pad is structurally fixed, said tilt angle being identical to that assumed by a pivoted pad, all other parameters remaining the same.

Further variations of the slider bearing are possible. For instance, neither the pad surface nor the bearing surface need to be planes. If one surface is convex relative to the other one, the system will operate as a crown bearing. It should be noted that minimum separation in the plane slider bearing occurs at the trailing edge of the pad. In the crown bearing, the point of minimum separation may be positioned more conveniently. Furthermore, in the crown bearing the pivot point may be at the center of the pad. In the slider bearing this is theoretically impossible since the total integrated supporting force on the pad would then equal zero and could not balance the applied load.

The instant invention consists of the utilization of the hydrodynamic effect described above to obtain constant separation between the pole face surface of the pole pieces of a magnetic head and the recording surface of a magnetic medium in high-density magnetic data storage systems. In practice, the two surfaces are biased toward each other through the application of force. Thereafter, an exchange of data between the pole pieces and the recording surface may be effected. Relative lateral motion of the two surfaces is initiated to expose different portions of the recording surface to the action of the magnetic head. In one embodiment, one of the surfaces is pivotally arranged with respect to the other one to form the desired angle of inclination or tilt angle therewith. A lubricating fluid is applied to keep at least a portion of the space between the surfaces filled. The relative lateral motion of the surfaces produces fluid flow which develops a hydrodynamic effect to cause the leading edge of the pivotally mounted surface to increase its spacing from the recording surface relative to the trailing edge. The hydrodynamic effect further exerts a lifting force, a component of which balances the biasing force at a predetermined spacing of the surfaces. It will be understood that the identical equilibrium condition may be achieved where no pivoting is used and the tilt angle between the surfaces is structurally fixed, all other parameters remaining the same. Given two surfaces, the velocity of fluid flow relative to one of the surfaces may determine the aforementioned component of force exerted. Accordingly other parameters remaining constant, the spacing between the surfaces may be changed by varying either the velocity of fluid flow relative to one of the surfaces or by varying the biasing force. An efficient method, requiring only simple apparatus to carry it out, has thus been provided to maintain constant separation between the pole face surface of a magnetic head and the recording surface of a magnetic medium, the separation spacing being readily controllable between 0 and ½ mil and hence small enough to permit high-density magnetic data recording.

The method herein described may be practiced in numerous ways though still remaining within the scope of the present invention. Unlike boundary lubrication which generally relies on a thin film of oil for smooth contact between the surfaces, the present invention may utilize either a liquid or a gas, preferably oil or air respectively, to achieve hydrodynamic lubrication. Although the use of air as a lubricant will entail simpler apparatus since the boundary layer of air immediately above the moving surface may be relied upon to maintain fluid flow, the use of oil has the advantage of providing a washing action of the two surfaces which will prevent damage to the surfaces incurred by loose particles of metal or dirt. Removal of these particles will also forestall the possible lifting of the heads off the film of fluid and the subsequent loss of data.

In order to expose different portions of the recording surface to the action of the magnetic head, either the recording surface of the magnetic medium may travel laterally relative to the stationary pole face surface of the magnetic head, or the situation may be reversed. Alternatively, both surfaces may move laterally, although at different velocities, in order to bring about relative lateral motion between them. The structure which permits the variable movement of the members toward each other is also subject to variation. Generally, it is simplest to divide up the requisite degrees of freedom between the members, i.e. that member which is stationary with respect to the other as regards relative lateral motion between the surfaces, is moveable with respect to the other member to vary the spacing between the surfaces. Where pivoting is used, the latter member has an additional degree of freedom which permits its surface to incline relative to the surface of the other member. The invention herein disclosed is equally applicable if the respective degrees of freedom are distributed in a different manner among the two members, or even if both members are free to move in identical fashion, e.g. where both members are moveably arranged to vary the spacing between the surfaces. Similarly, the biasing force may be applied to one or both members or may, depending on the arrangement of the apparatus, be merely due to the force of gravity. Where pivoting is used, it may be accomplished by means of a pivot point as well as a pivot axis. However, where point pivoting is employed, the rotational degree of freedom of the pivoted member about an axis perpendicular to the surface of the non-pivotal member must be suitably restricted. In systems where the biasing force is applied constantly, mechanical or solenoid means may be provided to keep the surfaces apart during the starting and stopping periods, if insufficient hydrodynamic supporting force exists during those periods to sustain the load of the biasing force.

The invention is applicable to any shape of magnetic medium, provided only that the recording surface is uniform so that constant separation may be maintained between it and the pole face surface of a magnetic head to facilitate the exchange of data between said surfaces. Thus, the medium may be in sheet, disk, strip, band or wire form, etc., and may be attached to a suitable support, or be driven directly to obtain lateral motion relative to the pole face surface. The support may be a drum, disk, roller, wheel, bobbin etc. or a plane surface or may, in fact, itself consist of magnetic material and constitute the magnetic medium.

Similarly, the magnetic head and its pole face surface may have any desired shape although the latter will at least in part be determined by such factors as the recording requirements, the shape of the recording medium, the relative configuration of both surfaces, the velocity of fluid flow, the nature of the fluid used and the manner of its application. Inasmuch as the configuration of the recording surface of the magnetic medium is largely governed by electrical design considerations, the pole face surface of the magnetic head must be shaped to take into account the above mentioned parameters. For example, it will be readily seen that smaller equilibrium separation is obtained when the fluid used is a low viscosity gas instead of a liquid. Similarly, the smaller the viscosity of a given liquid used, the smaller the hydrodynamic supporting force and hence, the smaller the separation obtained. Since relative surface speed determines the velocity of fluid flow, it will also determine the hydrodynamic supporting force exerted. Where relative surface speed and the viscosity of the lubricant are constant, the hydrodynamic force will be a function of surface area. The greater the area of the surface, the greater the force exerted thereon. Additionally, the component of hydrodynamic force available to balance the biasing force is dependent on the relative configuration of the pole face and recording surfaces, respectively. If both are flat and there is relative lateral motion between them, the system will operate like a plane slider bearing. Where the system operates as a crown bearing the equilibrium separation obtained, all other factors remaining equal, will be different from that of the slider bearing. Accordingly, the above mentioned factors will largely determine the shape of the head and its pole face surface. Variation is also possible in the manner of supporting the heads. Head mounts carrying one or more separate heads are feasible or, alternatively, a unitary structure may be provided having respective pairs of pole pieces embedded in its surface.

The invention may also be practiced by applying the fluid in a number of different ways. In a preferred method, the fluid is applied to the member whose surface moves laterally relative to the surface of the other or stationary member. The film of fluid which forms and is carried past the surface of the stationary member exerts the necessary hydrodynamic force upon the latter to balance the biasing force applied thereon. Alternatively, the fluid may be applied at the leading edge of the stationary member, where the moving surface picks it up and imparts lateral motion to it. If a liquid is used, additional apparatus is necessary to apply the liquid to the laterally moving surface. Where air is the lubricant and the separation is small, the velocity of the moving surface sets adjacent layers of air into motion to maintain a constant flow of air between the surfaces and no further apparatus is necessary.

The order of occurrence of the discrete steps of the method herein described may be varied to suit the requirements of the apparatus used, the steps of biasing the surfaces toward each other, initiating relative lateral motion between them, developing fluid flow and effecting an exchange of data between the pole pieces and the recording surface being freely interchangeable.

Figure 2A:
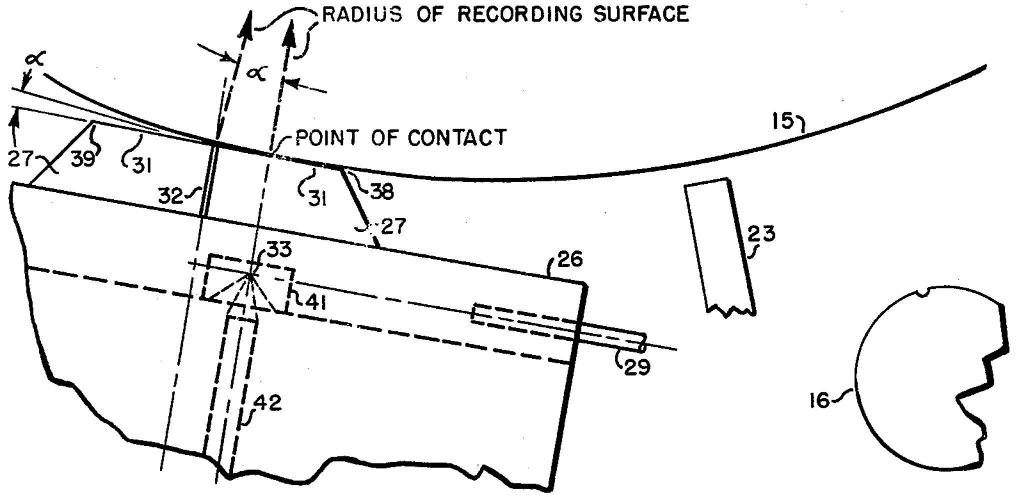
FIG. 2A is an enlarged detail view of FIG. 1 which illustrates the operation of the apparatus herein employed prior to the application of a fluid when the drum is at rest.
Figure 2B:
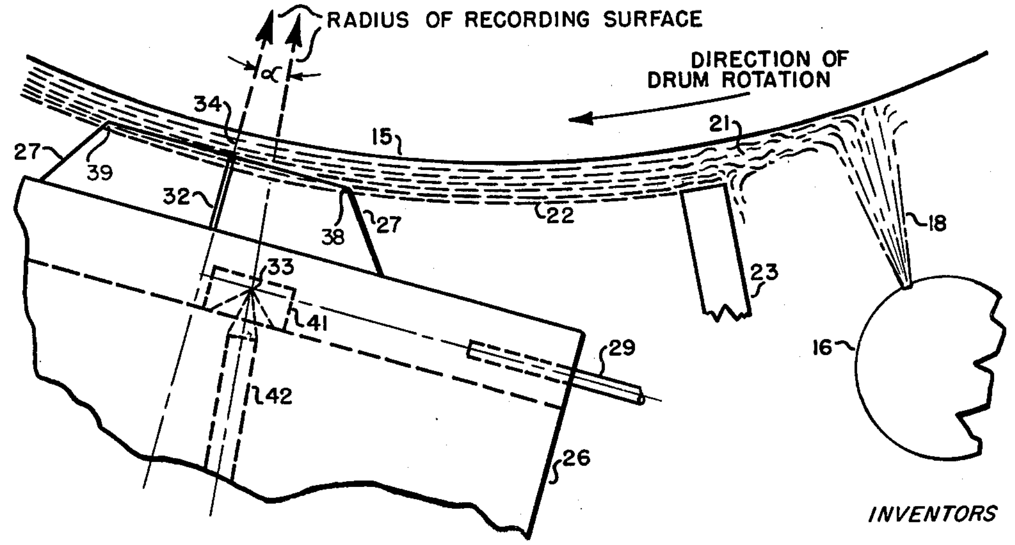
FIG. 2B is similar to FIG. 2A and illustrates the principle of the invention when fluid is applied and the drum is in motion.

With reference now to FIGS. 1, 2A and 2B, one embodiment is shown which practices the method described hereinabove. For the sake of clarity, the size of some of the dimensions of the apparatus has been exaggerated in the drawings to more clearly illustrate the invention. A hollow cylindrical drum 13 serves as the support for the magnetic medium which consists of closely spaced turns 14 of a continuous length of magnetic wire of either round or rectangular cross section wound on the face of the drum. This wire is commercially available as cunife wire and receives its special magnetic properties in the process of being drawn during manufacture. After the drum has been wound, the adjacent turns of wire are ground down to obtain a smooth recording surface 15. Housing 11, surrounds the drum and is provided with holes 19 to receive the bolts which hold down the top cover plate 20. Openings 12 in the enclosure permit ready access to the recording surface. The drum is mounted for rotation about its longitudinal axis within the housing, a suitable constant speed drive supplying the motive force. A capped oil pipe 16 is mounted over one of the openings 12 and is provided with holes 17 at suitable intervals to obtain an even distribution of the oil on the recording surface. Oil pumped into the pipe under pressure issues forth in small jets 18 to spray the recording surface as it rotates in a clockwise direction past the pipe. Wiper 23, which is supported by the drum housing, diverts the excess oil applied and tends to smooth out the initial flow turbulence 21, to provide a uniform film of oil 22 on the recording surface. A transparent enclosure 40 surrounds the housing to contain random oil sprays. Bracket 24, attached to the housing, supports a bank of head mounts 25, each of which in turn carries a dual magnetic head member comprising symmetrically positioned heads 26. For the sake of clarity, only two head mounts are shown in the drawing. Each head mount consists of spring means 28 arranged intermediate two rigid portions, one of said rigid portions terminating in a fixture unit which is attached to bracket 24. Both a two-leaf spring arrangement, as shown, or a single spring arrangement are feasible to bias the magnetic heads toward the recording surface. A pivot bearing pin 42, carried by one of the rigid portions of the head mount, mates with a pivot bearing 41, positioned intermediate the heads 26 of the magnetic head member, and permits pivotal motion of said member relative to the head mount about pivot point 33, as shown in FIGS. 2A and 2B. Accordingly, the magnetic head member may pivot relative to the recording surface about an axis through point 33 which is parallel to the drum axis. Rotary or skewing motion of the head member about the axis of the pivot pin is limited by stabilizing unit 29, comprising a stabilizing rod carried by the head member which rides between two limit stops carried by one of said rigid portions.

It should be noted that pivot point 33 is not aligned with gap 32 at the center of the head member. Accordingly, the pivotal motion of the head member about an axis through point 33 parallel to the drum axis, will determine the spacing of pole face surface 31 from the recording surface, as measured radially at gap 32. Additionally, in order to offset the effect of gravity which tends to cause an unbalance in the forces on the individual heads of the pair, with the upper head applying less force than the lower one, the pivot bearing is not positioned centrally between heads 26, but is located closer to the upper one of said heads. It should be noted that, where fixed heads are used, e.g. where the heads are non-pivotally arranged at a fixed tilt angle with the recording surface, the problem of aligning the pole face surfaces with the recording surface is more difficult than in the self-aligning structure described above. In that case, the fixture unit may be adjustable to provide the requisite amount of freedom to align the pole face surface. Each head carries two pole pieces 27 having abutting ends, two of said abutting ends protruding from the head structure. The protruding ends are separated from each other by gap 32 having a uniform gap length of about ¼ mil. The gap constitutes a discontinuity in the magnetic circuit formed by the pole pieces and contains a thin spacer of non-magnetic shim metal. The pole pieces and the shim spacer of each head are ground optically flat to form a common rectangular pole face surface 31 approximately thirty mils wide, having gap 32 centrally traverse its width. A centre-tapped coil of wire is wrapped around the pole pieces and is connected to terminals 30 having wires attached thereto to facilitate the application of signals to the pole pieces. The heads of the dual head member are mounted with the two rectangular pole face surfaces spaced in a common vertical plane and the long edges of the rectangles positioned horizontally. The head mount permits motion of the pole face surfaces relative to the recording surface in a direction to vary the spacing 34 between these surfaces, as measured at the gap along the radius of the recording surface. It will be obvious from the drawings, that spacing 34 constitutes the point of minimum separation between the pole face and recording surfaces. As pointed out above, in connection with the discussion of crown bearings, this point may be conveniently located anywhere on the pad surface depending on the geometry of the configuration. Accordingly, the gap need not be positioned centrally of the pole face surface. In the latter case, minimum separation will still occur under the gap if the pivot point is moved accordingly. The width of each pole face surface defines a track 35, shown in dotted outline in FIG. 1, on the magnetic recording surface due to the latter surface's lateral motion relative to the pole face surfaces. A nominal spacing of 10 mils between tracks is necessary in order to avoid cross talk between the data stored on adjacent tracks, making the pitch distance between tracks approximately 40 mils. Each head mount may carry a single head or a plurality of heads, as desired. The head mounts are preferably arranged in banks, respective banks being supported from individual brackets spaced around the circumference of a drum enclosure. For simplicity, only one bank of head mounts is shown in the drawing. The number of head mounts supported by a single bracket is determined by the length of the drum. Since it is impractical to mount the heads of one bracket at a pitch distance of 40 mils, successive banks of heads interleave with each other to cover the interstices between tracks left open by the heads of a preceding bank. Special procedures are generally required to obtain initial alignment of all the heads. In the instant embodiment, the head mounts are uniformly positioned along each bracket 24, respective head mount pivot pins being spaced from each other at a distance sixteen times the pitch distance between tracks. Each mount is pivotally adjustable with respect to its bracket. A bar of non-conducting material having conducting laminations of 1 mil thickness spaced at sixteen track intervals is aligned next to the bracket. Electrical terminals are attached to each conducting lamination and a single terminal is located on the metal bracket. Each electrical circuit is completed through an individual light bulb connected between its particular lamination terminal and the bracket terminal. Energization of the individual circuits will cause the respective light bulbs to glow when the pivot pins of respective head mounts contact their corresponding laminations. The head mounts are firmly fixed to the bracket when this condition obtains. Individual brackets have positioning holes which mate with dowel pins on the drum housing, the dowel pins being arranged so as to produce interleaving of the heads once the head mounts have been aligned on the brackets. It will be seen that respective brackets, including the head mounts they carry, are freely interchangeable on the housing. Additionally, individual dual head members may be removed from their respective head mounts, substituted thereon or replaced, without the necessity of readjusting them. This is due to the fact that the two gaps of the pole face surfaces of any dual head members are self aligning once the pivot pins of the head mount has been aligned. It will be obvious that apparatus for moving the entire bracket, including the head mounts and heads, along the drum surface may be provided, if it is desired to minimize the number of heads used. In this case, a single head will be utilized to record or read out information in different tracks. Such economy, however, must be paid for in the increased access time required to reach the stored data.

In operation, the leaf springs exert a constant biasing force which urges the pole face surfaces of each head against the recording surface. The position of a head relative to the recording surface, prior to the application of oil and the initiation of drum rotation, is illustrated in FIG. 2A. The biasing force of the leaf springs is transmitted to the head member through the pivot pin, urging pole face surface 31 into contact with the recording surface. In the static state, the pivot pin axis is aligned with a drum radius and is intersected by the line of contact along the recording surface. The pole face surface is out of contact with the recording surface in the vicinity of the gap and forms an angle "$\alpha$" with a line tangent to the recording surface opposite the gap. The point of contact on the pole face surface occurs in line with the pivot pin axis as shown. As noted above, physical contact between the recording and pole face surfaces during the starting period exists only when a constant biasing force is applied to the head member, where no means are provided to counteract such force during this period.

FIG. 2B illustrates the operation of the hydrodynamic effect in the apparatus herein employed. After drum rotation is initiated, oil is sprayed onto the recording surface and forms a uniform film thereon, as explained above. It should be noted that the thickness of the oil film is not critical and may vary in the instant case from 0.7 mil to 20 mils. The lower limit is established by the minimum equilibrium separation which is desired at the gap, and is based on the requirement that the entire pole face surface 31 be exposed to the oil. It will be obvious from the drawings, that the sides of the pole pieces will be slightly submerged in the oil in this case. The upper limit corresponds to the distance pole pieces 27 protrude from head 26. A film thickness in excess of 20 mils will result in an undesired contribution to the hydrodynamic supporting force from the lower head surface. The lateral motion of the recording surface is imparted to the film thereon and develops a flow of oil relative to each pole face surface. The hydrodynamic effect causes leading edge 38 of the pole face surface to increase its spacing from the recording surface relative to trailing edge 39, the resulting moment rotating the pole face surface through the predetermined tilt angle "α" into a position where the gap assumes the point of minimum separation 34 from the recording surface. Concurrently, a component of force of the total hydrodynamic effect developed, exerts a lift on the pole face surface urging the latter away from the recording surface until equilibrium is reached between the biasing force and the component of force at a predetermined spacing 34, as measured radially at the gap.

As explained above, any skewing motion of the head members is limited by the interaction of the positioning rods and the limit stops, while the unbalance in the forces on the individual heads of each pair due to gravity is offset by the offcenter position of the pivot bearing. A rotational moment in either direction about an axis parallel to the positioning rod, which may tend to decrease the spacing of one head of the dual head member from the recording surface while increasing the spacing of the other head of the same member, is counteracted by the pontoon action of the dual head member. This pontoon action balances out the rotational moment by exerting an increased hydrodynamic supporting force on the head whose spacing from the recording surface tends to decrease.

The oil which ultimately leaves the recording surfaces due to the action of gravity or of centrifugal force, is collected in a sump (not shown). After being filtered to enable it to maintain its washing function, it is circulated under pressure to be reapplied to the recording surface.

Upon the application of signals to terminals 30, information is recorded on the recording surface. Similarly, the same terminals serve to read stored information out of the system.

The type of slider bearing utilized herein may be thought of as a crown bearing having flat pole face surfaces and a convex recording surface. If greater hydrodynamic lift is desired, the pole face surfaces may be ground concave to conform to the convex recording surface and effectively produce plane slider bearings.

Having thus described the invention, it will be apparent that numerous modifications and departures, as explained above may now be made by those skilled in the art, all of which fall within the scope contemplated by the invention. Consequently, the invention herein disclosed is to be construed as limited only by the spirit and scope of the appended claim.

We claim:

A high-density magnetic data storage system comprising a cylindrical drum, a magnetic medium supported on the outside surface of said drum, said medium presenting a uniform recording surface, a housing surrounding said drum, said housing having vertical openings spaced around its circumference to permit ready access to said recording surface along the entire height thereof, a plurality of vertical brackets attached to said housing adjacent respective ones of said vertical openings, each of said brackets supporting a bank of magnetic head mounts attached at spaced intervals along the height of the bracket, each of said head mounts comprising spring means arranged intermediate two rigid portions, each of said head mounts carrying a head member having at least one magnetic head, said head comprising two ferrite pole pieces having mutually abutting ends which terminate in a common rectangular pole face surface bounded by two long edges, a leading edge and a trailing edge and having said gap extend across its width, said spring means flexibly biasing the pole face surface into physical contact with said recording surface before said system is energized, said pole face surface being adapted to assume a predetermined tilt angle with respect to said recording surface, said drum being mounted within said housing for rotation about its longitudinal axis to expose different portions of said recording surface to the action of said pole pieces, the width of each one of said pole face surfaces defining a circular magnetic track of equal width around said recording surface when the latter rotates relative to said pole face surfaces, said banks of head mounts being positioned on their respective brackets to interleave with the interstices between tracks left open by the heads of a preceding bank, a drum drive to supply the motive force for drum rotation, a supply of oil of predetermined viscosity, means for spraying said oil onto said recording surface at spaced intervals along the length of the drum, means for diverting the excess oil and smoothing the remainder so applied to develop a uniform film of oil on said recording surface having predetermined limits of thickness, the motion of said recording surface being imparted to said film of oil to develop oil flow relative to each one of said pole face surfaces and substantially between the pole face surfaces and the recording surface, said flow developing a hydrodynamic effect which exerts a lifting force upon each of said pole face surfaces, said hydrodynamic effect further exerting a moment upon each of said pole face surface urging the leading edge thereof to increase its spacing from said recording surface relative to the trailing edge, the combined hydrodynamic effect upon each of said pole face surfaces having a component of force which balances said biasing force when said pole face surface is positioned at said predetermined tilt angle with respect to said recording surface and with said gap located at the point of predetermined minimum spacing of said surfaces, and means to produce a flow of magnetic flux in said gap to effect an exchange of data between each of said pole pieces and the portions of said recording surface defined by said magnetic tracks across said spacing while maintaining constant separation between said surfaces.

References Cited in the file of this patent

UNITED STATES PATENTS

| | | |
|---|---|---|
| 2,584,770 | Wilcock | Feb. 5, 1952 |
| 2,612,566 | Anderson | Sept. 30, 1952 |
| 2,673,249 | Ericsson | Mar. 23, 1954 |
| 2,710,234 | Hansen | June 7, 1955 |
| 2,772,135 | Hollabaugh et al. | Nov. 27, 1956 |
| 2,862,781 | Baumeister | Dec. 3, 1958 |

FOREIGN PATENTS

| | | |
|---|---|---|
| 688,554 | Great Britain | Mar. 11, 1953 |